United States Patent
Kipp et al.

(10) Patent No.: US 10,393,104 B2
(45) Date of Patent: Aug. 27, 2019

(54) COMPRESSOR SYSTEM AND METHOD FOR OPERATING THE COMPRESSOR SYSTEM IN DEPENDENCE ON THE CURRENT SITUATION OF THE RAIL VEHICLE

(71) Applicant: KNORR-BREMSE SYSTEME FÜR SCHIENENFAHRZEUGE GMBH, Munich (DE)

(72) Inventors: Thomas Kipp, München (DE); Gert Assmann, München (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 396 days.

(21) Appl. No.: 15/101,842

(22) PCT Filed: Dec. 2, 2014

(86) PCT No.: PCT/EP2014/076165
§ 371 (c)(1),
(2) Date: Jun. 3, 2016

(87) PCT Pub. No.: WO2015/082431
PCT Pub. Date: Jun. 11, 2015

(65) Prior Publication Data
US 2016/0377075 A1 Dec. 29, 2016

(30) Foreign Application Priority Data

Dec. 5, 2013 (DE) .................. 10 2013 113 556

(51) Int. Cl.
*F04B 49/08* (2006.01)
*B60T 17/22* (2006.01)
(Continued)

(52) U.S. Cl.
CPC ............ *F04B 49/08* (2013.01); *B60T 17/228* (2013.01); *B61D 27/00* (2013.01); *B61L 25/025* (2013.01);
(Continued)

(58) Field of Classification Search
CPC ...... F04B 35/04; F04B 39/0027; F04B 41/02; F04B 49/02; F04B 49/022; F04B 49/03;
(Continued)

(56) References Cited

U.S. PATENT DOCUMENTS 4,756,669 A  7/1988  Hata
4,850,652 A  7/1989  Dumas et al.
(Continued)

FOREIGN PATENT DOCUMENTS

CN  102114847 A  7/2011
DE  3871575 T2  12/1992
(Continued)

OTHER PUBLICATIONS

Japanese Office Action for corresponding Application JP2016-536599, dated Jul. 6, 2017.
(Continued)

*Primary Examiner* — Bryan M Lettman
*Assistant Examiner* — Charles W Nichols
(74) *Attorney, Agent, or Firm* — Barnes & Thornburg LLP

(57) ABSTRACT

A rail vehicle compressor system and method for controlling the same uses a compressor driven by an electrical machine via a drive shaft to produce compressed air for at least one compressed air tank, wherein the electrical machine can be activated at least indirectly via a control device for operating the electrical machine at at least one speed between a maximum speed and a minimum speed, wherein at least one pressure sensor determines the pressure for the control
(Continued)

device and a final control element continuously influences the speed of the electrical machine, wherein activation of the final control element takes place via the control device in accordance with a sensor device, comprising at least one sensor element for sensing at least one external boundary condition of the rail vehicle.

14 Claims, 2 Drawing Sheets

(51) Int. Cl.
| | |
|---|---|
| *F04B 35/04* | (2006.01) |
| *F04B 41/02* | (2006.01) |
| *F04B 49/06* | (2006.01) |
| *F04B 49/20* | (2006.01) |
| *B61D 27/00* | (2006.01) |
| *B61L 25/02* | (2006.01) |

(52) U.S. Cl.
CPC ............. *F04B 35/04* (2013.01); *F04B 41/02* (2013.01); *F04B 49/06* (2013.01); *F04B 49/20* (2013.01); *B61L 2205/04* (2013.01); *F04B 2203/0209* (2013.01); *F04B 2205/05* (2013.01)

(58) Field of Classification Search
CPC ........ F04B 49/06; F04B 49/065; F04B 49/08; F04B 49/10; F04B 49/103; F04B 49/106; F04B 49/20; F04B 49/22; F04B 53/001; F04B 2201/1201; F04B 2203/0209; F04B 2205/05; F04B 2205/06; F04B 2205/063; F04B 2207/00; F04B 2207/02; F04B 2207/042; F04B 2207/044; F04C 29/06; F04D 25/06; F04D 27/004; B60T 15/48; B60T 17/002; B60T 17/004; B60T 17/006; B60T 17/008; B60T 17/02; B60T 17/06; B60L 1/003; B60L 2200/26; B60L 2240/36; B60L 2240/421; B60L 2260/26; B60L 2270/142; B61D 43/00; B61L 25/025; B61L 2205/02; B61L 2205/04; B61H 13/34; Y02T 10/642; Y02T 30/36
See application file for complete search history.

(56) References Cited

U.S. PATENT DOCUMENTS

| | | | | |
|---|---|---|---|---|
| 5,010,739 | A | * | 4/1991 | Isshiki ................ F04D 27/004 181/175 |
| 6,390,779 | B1 | * | 5/2002 | Cunkelman ............. F04B 25/00 417/14 |
| 7,344,201 | B1 | * | 3/2008 | Bates ...................... B60T 17/02 303/11 |
| 7,600,988 | B2 | | 10/2009 | Doerr et al. |
| 7,743,617 | B2 | * | 6/2010 | Crane ...................... F25B 49/02 62/163 |
| 7,908,055 | B2 | * | 3/2011 | Leinung ................. B60T 17/02 701/36 |
| 2004/0175272 | A1 | | 9/2004 | Kisak et al. |
| 2004/0265134 | A1 | | 12/2004 | Iimura et al. |
| 2009/0193896 | A1 | * | 8/2009 | Rose ........................ G01H 3/04 73/584 |

FOREIGN PATENT DOCUMENTS

| | | |
|---|---|---|
| DE | 4219514 A1 | 12/1993 |
| DE | 102007019126 A1 | 10/2008 |
| DE | 102012223996 A1 | 6/2014 |
| EP | 1394415 A2 | 8/2003 |
| JP | S5862189 | 4/1983 |
| JP | 2008184131 A | 8/2008 |
| JP | 2010216284 A | 9/2010 |
| RU | 2003127109 A | 3/2005 |
| WO | 2012084517 A1 | 6/2012 |
| WO | 2013154169 A1 | 12/2015 |

OTHER PUBLICATIONS

German examination report dated Oct. 13, 2014.
Search report for International Patent Application No. PCT/EP2014/076165; dated Feb. 23, 2015.
Russian Office Action for corresponding Application , dated Aug. 4, 2017.
"Train-Stop and Pneumatic Equipment of a Rolling Stock of a Rail Vehicle", Catalogue of Associated Hardware, ASTO, Moscow, 2003, pp. 140 and 141.

* cited by examiner

COMPRESSOR SYSTEM AND METHOD FOR OPERATING THE COMPRESSOR SYSTEM IN DEPENDENCE ON THE CURRENT SITUATION OF THE RAIL VEHICLE

PRIORITY CLAIM

This patent application is a U.S. National Phase of International Patent Application No. PCT/EP2014/076165, filed 2 Dec. 2014, which claims priority to German Patent Application No. 10 2013 113 556.0, filed 5 Dec. 2013 the disclosure of which are incorporated herein by reference in their entirety.

FIELD

The disclosed embodiments relate to a compressor system for a rail vehicle, comprising a compressor which is driven by an electric machine via a drive shaft and which serves for generating compressed air for at least one compressed-air vessel, wherein the electric machine can be controlled at least indirectly by means of a regulation device for operation of the electric machine at at least one rotational speed between a maximum rotational speed and a minimum rotational speed, wherein furthermore, in a compressed air-conducting line arranged downstream of the compressor, there is arranged at least one pressure sensor for determining the pressure for the regulation device. The disclosed embodiments also relates to a method for controlling the compressor system according to the disclosed embodiments.

BACKGROUND

Compressors in rail vehicles are subject to a variety of, in part, conflicting demands, such as for example a high delivery output, adequate activation duration, low sound emissions, low energy consumption, a small structural space, and low purchase and life-cycle costs. Here, the compressor must satisfy extremely different demand profiles depending on the operating state or situation of the rail vehicle. The typical problem in designing a compressor is that of finding the best comprise between these demands which is acceptable in all operating states of the rail vehicle or in every situation of the rail vehicle. In general, electrically driven compressors are used in rail vehicles. The operation of the compressors takes the form of on/off operation with a constant rotational speed, the so-called rated rotational speed, between the lower activation pressure and the upper deactivation pressure. The compressor is dimensioned such that a predefined filling time is attained and a minimum activation duration during operation is not undershot.

From the generally known prior art, it emerges that, between the different operating states of the rail vehicle, there is no difference in the operation of the compressor. Here, the fan of the cooling system is subject to the same operating regime as the compressor, as the fan is generally directly jointly driven by the compressor.

During a filling phase, the compressor is operated at the rated rotational speed. The rated rotational speed is selected such that the compressor can be operated continuously. Furthermore, the structural size of the compressor is selected such that, during track operation, a minimum activation duration is not undershot, and the maximum filling time is not overshot. During track operation, the compressor is operated intermittently. In this case, the compressor is started when the pressure in the compressed-air vessel has fallen to the activation pressure. When the deactivation pressure is reached in the compressed-air vessel, the compressor is operated at the rated rotational speed. The compressor is deactivated when the deactivation pressure is reached, and is restarted only when the pressure has dropped to the activation pressure. In the case of electrically driven rail vehicles, the drive motor is used as an electrodynamic brake during a braking phase. In the process, electrical energy is generated, wherein it is often not economical, or is in part impossible, for the electrical energy to be fed back into the electrical grid. During station operation, when the rail vehicle is stopped at a station, the compressor is operated intermittently, as it is during travel. Since there is no dominant travelling noise, sound emissions of the compressor and of the fan may be avoided. Since, when at a station, the pneumatic suspension exhibits an increased air demand owing to the embarking/disembarking of passengers, this often leads to the activation of the compressor and of the fan, and thus to undesired sound emissions while the rail vehicle is stopped at the station. Furthermore, in particular in the case of regional transport, rail vehicles are often parked in the vicinity of residential areas in an energized state, for example in order to prevent freezing. Here, sound emissions may be prevented to the greatest possible extent. Owing to leakage, it is often the case that the pressure in the compressed-air vessels falls to the lower activation pressure of the compressor overnight, such that refilling is necessary, and the compressor is operated intermittently at rated rotational speed. In this case, not only the sound emissions of the compressor but also further noises, such as for example the disturbing ventilation noise of the air dryer, are generated.

Information regarding the respective operating state of the rail vehicle is in many cases not available for the regulation of the compressor. If information regarding the respective operating state of the rail vehicle is available, coordination with the regulation of the compressor must be implemented, such that simple upgrading is not possible.

SUMMARY

The problem addressed by the presently disclosed embodiments is, therefore, that of optimizing a compressor system and a method for operating the compressor system such that energy-efficient operation, with a reduction in sound emissions, of the compressor system is realized in a manner dependent on the present situation of the rail vehicle, which operation thus does not require information regarding an operating state of the rail vehicle.

BRIEF DESCRIPTION OF THE DRAWINGS

Disclosed embodiments are explained more specifically below with reference to the accompanying drawings, in which.

DETAILED DESCRIPTION

Figure 1:
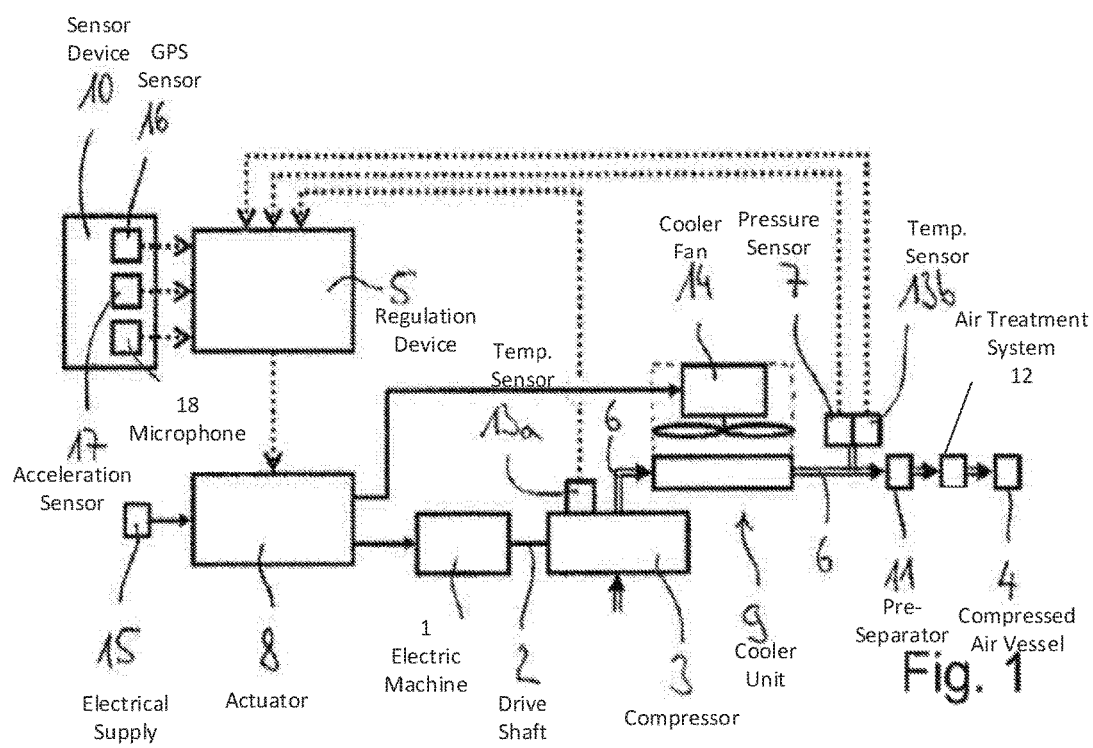
FIG. 1 shows a block circuit diagram of the compressor system according to the disclosed embodiments.

According to at least one disclosed embodiment, an actuator for the continuous manipulation of the rotational speed of the electric machine is arranged between an electrical supply and the electric machine, wherein the actuator is controlled by means of the regulation device in accordance with the output of a sensor device comprising at least one sensor element for detecting at least one external boundary condition of the rail vehicle. The sensor device thus makes information regarding the present operating situation of the rail vehicle, and information regarding the present conditions of the surroundings of the rail vehicle, available to the regulation device of the compressor system. Measurable measurement variables or boundary conditions are, for example, the sound level in the surroundings of the rail vehicle, and the speed and acceleration of the rail vehicle.

In other words, the actuator is situated upstream of the electric machine in the power flow, and is thus positioned ahead of the electric machine. The actuator permits operation of the electric machine at different rotational speeds. Frequency converters or inverters are particularly suitable for this purpose. In a manner dependent on frequency, the rotational speed of the electric machine and thus the operation of the compressor are adapted. Through the control of the actuator in accordance with the output of the sensor device, situation-based regulation of the compressor system is realized by way of the regulation device. Situation-based boundary conditions are determined from measurement variables which are determined by the sensor elements of the sensor device and provided to the regulation device. Conceivable measurement variables include time, speed, acceleration, temperature, vibration, air humidity, sound and location. The rotational speed regulation of the compressor system offers not only the advantage of reduced energy consumption but also further advantages such as, for example, reduced sound emissions in relevant situations and the omission of passive measures for sound reduction and gentler operation of the compressor owing to a reduced rotational speed and a reduced counterpressure in the at least one compressed-air vessel.

According to at least one disclosed embodiment that the regulation device at least indirectly controls a cooler unit which is arranged downstream of the compressor and which has a cooler fan, wherein a rotational speed of the cooler fan can be continuously adjusted by the regulation device. For this purpose, an actuator may be integrated in the cooler unit. It is alternatively also conceivable for the actuator to be at least positioned upstream of the cooler unit. By means of situation-based regulation of the rotational speed of the cooler fan, the ingress of water in a downstream air dryer can be reduced, whereby air consumption of the air dryer is likewise reduced.

According to at least one disclosed embodiment provided that the sensor device comprises at least one GPS sensor for measuring a speed of the rail vehicle and at least one acceleration sensor for measuring an acceleration of the rail vehicle and at least one microphone for measuring a sound level in the surroundings of the rail vehicle. Here, the speed and the acceleration of the rail vehicle constitute internal boundary conditions, wherein the sound level constitutes an external boundary condition. It is however also conceivable for the speed to be measured by way of other sensors, for example by way of a laser sensor directed toward the rails. Furthermore, a person skilled in the art is also familiar with other sensor units, which are not mentioned here, for measuring respective external and/or internal measurement variables or boundary conditions.

With regard to a method, the compressor is operated, in accordance with the output of the sensor device, with a variable rotational speed which assumes any intermediate value between the maximum rotational speed and the minimum rotational speed. By virtue of the fact that the cooling unit is not connected either directly or indirectly to the compressor, separate control of the cooling unit and thus separate adjustment of the rotational speed of the cooler fan are performed. It is advantageously also possible for the compressor and the cooler fan to be deactivated.

According to at least one disclosed embodiment provided that, in the presence of a relatively high sound level and an approximately constantly high speed, the regulation device operates the compressor with a variable rotational speed slightly above the minimum rotational speed, wherein the air pressure in the at least one compressed-air vessel is set to be slightly higher than the activation pressure. Thus, the regulation device determines that the rail vehicle is in track operation on the basis of the various items of information provided by the various sensor elements of the sensor device. During track operation of the compressor, a maximum energy saving by the compressor is of primary importance, this being achieved by way of the variable operation of the compressor at the at least minimum rotational speed. Consequently, the compressor generates only the amount of compressed air required for setting the air pressure slightly higher than the activation pressure in the at least one compressed-air vessel.

By means of the pressure sensor, the pressure profile can be monitored, such that the air pressure in the at least one compressed-air vessel is set to be approximately constant to one-tenth to two-tenths of a bar above the activation pressure of the compressor. Depending on the present compressed-air consumption, the rotational speed of the electric machine and thus the rotational speed of the compressor vary in order to keep the air pressure in the at least one compressed-air vessel approximately constant.

This yields the advantage that, owing to a lower counterpressure in the at least one compressed-air vessel, the energy consumption is reduced, and more gentle operation of the compressor is realized. This furthermore results in a lower operating temperature of the compressor, whereby the cooling requirement of the compressor is likewise reduced. Furthermore, the cooler fan of the cooler unit is operated such that, within the desired temperature range, the lowest possible temperature of the compressed air at the outlet of the compressor is attained. This offers the advantage of a greater fraction of liquid water and a lower fraction of water vapour in the compressed air. The liquid water can be separated off in a pre-separator, whereas the water vapour is separated off in the air dryer. Thus, the ingress of water into the drying agent is reduced, whereby a reduced fraction of the compressed air is required for regeneration.

According to at least one disclosed embodiment provided that, in the presence of a negative acceleration, the regulation device operates the compressor with a maximum rotational speed until a deactivation pressure of the compressor is reached and provides a feed to the at least one compressed-air vessel, wherein, after the deactivation pressure is reached, the compressor is operated with a variable rotational speed below the maximum rotational speed.

In other words, the available electrical energy during braking operation of the rail vehicle is utilized for completely filling the at least one compressed-air vessel. Subsequently, the rotational speed of the compressor decreases into the range above the minimum rotational speed, and maintains the pre-defined maximum pressure in the at least one compressed-air vessel until the end of the braking operation. This offers the advantage of internal utilization of the electrical energy during braking operation, and permits an energy saving, because a feedback of the electrical energy into the electrical grid is not always possible. Therefore, during braking operation of the compressor, the primary aim is that of achieving maximum energy recovery of the compressor. This is attained in particular by way of a maximum infeed of compressed air into the at least one compressed-air vessel during braking operation, and by maintaining the maximum positive pressure in the at least one compressed-air vessel.

According to at least one disclosed embodiment provided that the compressor is deactivated after the negative acceleration has come to an end, and is set to the minimum rotational speed when the activation pressure is reached. Thus, at the end of the braking phase, during subsequent operation, the compressor saves energy that has been consumed during the braking phase. The deactivation of the compressor or the setting of the minimum rotational speed is maintained until the pressure in the at least one compressed-air vessel reaches the activation pressure of the compressor.

In one exemplary embodiment, when the rail vehicle is at a standstill and in the presence of a relatively low sound level in the surroundings of the rail vehicle, the regulation device operates the compressor with intermittent alternation between deactivation when the pressure falls to the activation pressure and operation with the minimum rotational speed when the deactivation pressure is reached.

Thus, at a standstill in station operation or overnight standby operation, the compressor can be deactivated or kept at minimum rotational speed until the activation pressure is reached in the at least one compressed-air vessel. It is thus possible to predominantly avoid operation of the compressor during station operation. The cooler fan remains deactivated for as long as possible, or is operated at only such a speed that the admissible maximum temperature in the compressor or at the compressed-air outlet is not exceeded. In this way, during stoppages at stations, sound emissions from the compressor and from the cooler fan are minimized. Furthermore, the entire compressor system can be constructed in such a way as to save structural space, as the possibility of dispensing with passive measures for sound deadening is eliminated. Therefore, during station operation of the compressor, the primary aim is that of achieving minimal sound emissions of the compressor and of the cooler fan. This is achieved in particular by virtue of the compressor and the cooler fan being deactivated or being operated at minimum rotational speed.

It is advantageously provided that, when the rail vehicle is at a standstill and in the presence of a relatively high sound level in the surroundings of the rail vehicle, the regulation device operates the compressor with the maximum rotational speed until either the relatively high sound level falls again or the deactivation pressure is reached. In this way, the high sound level in the surroundings of a stationary rail vehicle, the high sound level being generated for example by a passing cargo train, can be utilized in order, in this situation, to increase the rotational speed of the compressor and of the cooler fan and thus fill the at least one compressed-air vessel within an extremely short time. Perceptible sound emissions are eliminated owing to the high sound level in the surroundings.

Owing to the determination of substantially external information and boundary conditions by the sensor device of the rail vehicle, the regulation device is operated, in accordance with the situation of the rail vehicle, such that energy for operating the compressor system is saved and the sound emissions of the compressor system are lowered. Internally provided information with regard to a wide variety of operating states of the rail vehicle is expedient but is not required.

As per FIG. 1, a compressor system for a rail vehicle has an electric machine 1 which, via a drive shaft 2, drives a compressor 3 for generating compressed air. The compressed air generated by the compressor 3 is conducted via a compressed air-conducting line 6 to a cooler unit 9 which has a cooler fan 14. A pressure sensor 7 and a temperature sensor 13$b$ are arranged downstream of the cooler unit 9 in the compressed air-conducting line 6. Furthermore, the compressed air-conducting line 6 issues into a pre-separator 11, downstream of which there is connected an air treatment system 12. The dried compressed air, which has been purified of particles, is then fed into a compressed-air vessel 4. A temperature sensor 13$a$, which is arranged at the compressor 3, and the temperature sensor 13$b$ and the pressure sensor 7 all transmit the measured temperatures and the measured pressure to the regulation device 5. Furthermore, the regulation device 5 also receives signals from a sensor device 10. The sensor device 10 comprises a GPS sensor 16 for measuring a speed v of the rail vehicle and an acceleration sensor 17 for measuring an acceleration b of the rail vehicle and a sound sensor 18 for measuring a sound level s in the surroundings of the rail vehicle. Furthermore, the regulation device 5 is suitable for both controlling the rotational speed of the cooler unit 9 and transmitting signals to an actuator 8. The actuator 8, which is in the form of a frequency converter, sets the rotational speed of the electric machine 1 and thus the rotational speed of the compressor 3. Furthermore, the actuator 8 has two outlets and thus also sets the rotational speed of the cooler fan 14 by way of the regulation device 5. In this case, the actuator 8 is, for the continuous manipulation of the rotational speed of the electric machine 1, arranged between an electrical supply 15 and the electric machine 1. The actuator 8 is controlled by way of the regulation device 5 in accordance with the output of the sensor device 10.

Figure 2:
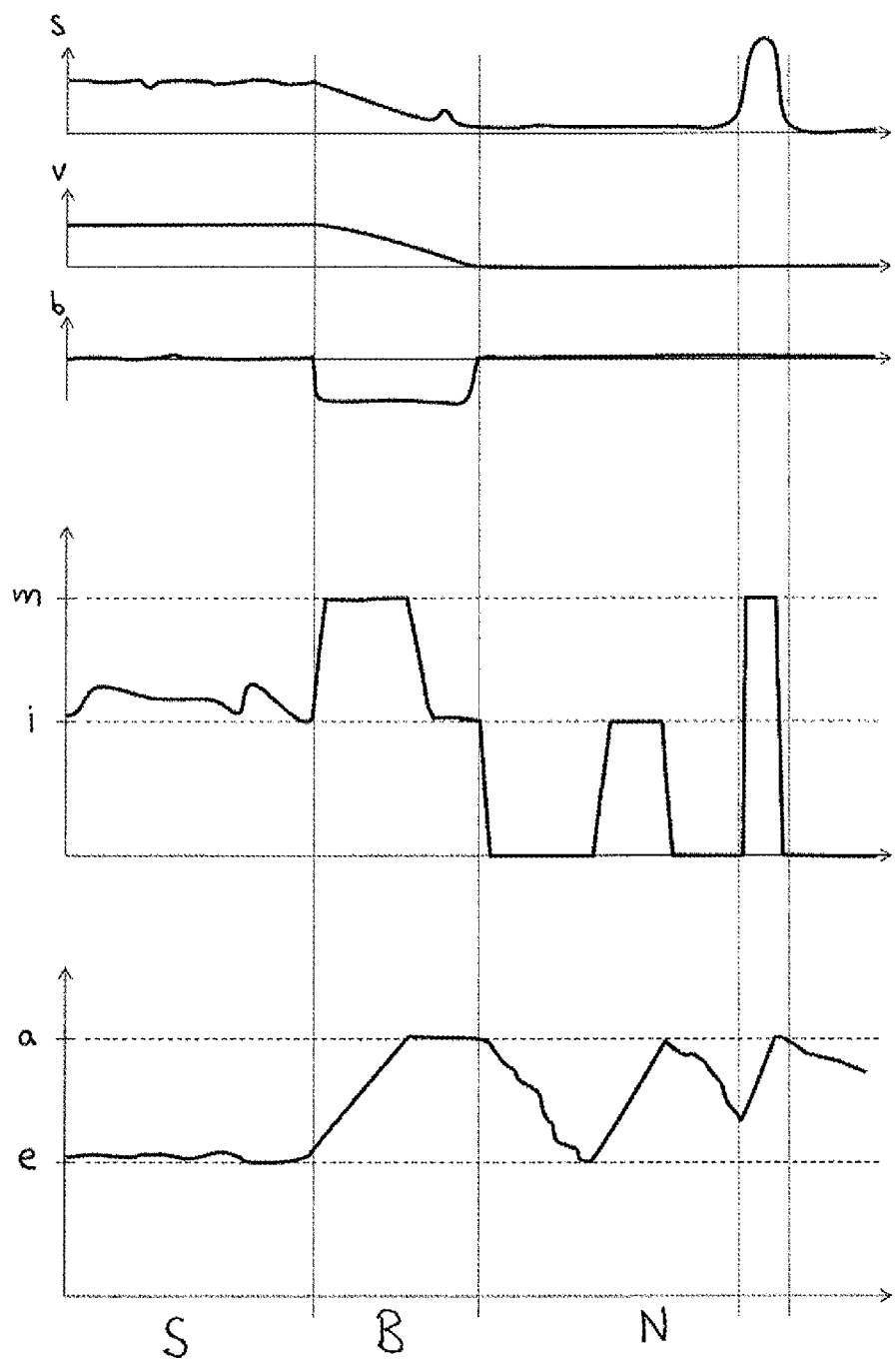
FIG. 2 shows five related diagrams, wherein, from top to bottom, a sound level, a speed and an acceleration of the rail vehicle and a rotational speed and a pressure in the compressed-air vessel are plotted versus the time.

In FIG. 2, it can be seen that the air pressure in the compressed-air vessel 4 can be adjusted by way of the rotational speed of the compressor 3. The fourth diagram from the top illustrates the profile of the rotational speed versus time, and the fifth diagram from the top illustrates the profile of the air pressure in the compressed-air vessel 4 versus time. The first three diagrams from the top depict the profiles of a sound level in the surroundings of the rail vehicle, of a speed and of an acceleration of the rail vehicle. The five diagrams are synchronized with one another with regard to the time axis, and the time axis is divided substantially into three operating modes. These are track operation N, braking operation B and station operation S.

Here, in track operation N, which exhibits a relatively high sound level s and an approximately constantly high speed v, the regulation advice 5 operates the compressor 3 with a variable rotational speed slightly above the minimum rotational speed i. The air pressure in the compressed-air vessel 4 is set to a value slightly higher than the activation pressure e.

By contrast, during a negative acceleration b during braking operation B, the regulation device 5 operates the compressor 3 with a maximum rotational speed m until a deactivation pressure a of the compressor 3 is reached and provides a feed to the at least one compressed-air vessel 4. After the deactivation pressure a is reached, the compressor 3 is operated with a variable rotational speed below the maximum rotational speed m.

When the rail vehicle is at a standstill and in the presence of a relatively low sound level s in the surroundings of the rail vehicle, the regulation device 5 operates the compressor 3 with intermittent alternation between deactivation of the compressor 3 when the pressure falls to the activation pressure e and operation with the minimum rotational speed i when the deactivation pressure a is reached. In the event of an increase of the sound level s in the surroundings of the rail vehicle to a relatively high value, the compressor 3 is operated with the maximum rotational speed m until the relatively high sound level s falls again.

The disclosed embodiments are not restricted to the embodiments described above. Rather, modifications thereto are also possible which are also encompassed by the scope of protection of the following claims. For example, it is also possible for the compressor 3 to provide a feed to a multiplicity of compressed-air vessels 4.

LIST OF REFERENCE SIGNS

1 Electric machine
2 Drive shaft
3 Compressor
4 Compressed-air vessel
5 Regulation device
6 Compressed air-conducting line
7 Pressure sensor
8 Actuator
9 Cooler unit
10 Sensor device
11 Pre-separator
12 Air treatment system
13a, 13b Temperature sensor
14 Cooler fan
15 Electrical supply
16 GPS sensor
17 Acceleration sensor
   18 Microphone
a Deactivation pressure
e Activation pressure
i Minimum rotational speed
m Maximum rotational speed
b Acceleration
g Speed
s Sound level
B Braking operation
N Track operation
S Station operation

The invention claimed is:

1. A compressor system for a rail vehicle, the compressor system comprising:
   at least one compressed-air vessel;
   an electric machine;
   a drive shaft;
   a compressor driven by the electric machine via the drive shaft and generating compressed air for the at least one compressed-air vessel;
   a regulation device that at least indirectly controls operation of the electric machine at at least one rotational speed between a maximum rotational speed and a minimum rotational speed;
   a compressed air-conducting line arranged downstream of the compressor, and including at least one pressure sensor for determining pressure for the regulation device;
   and an electrical supply, wherein the actuator continuously manipulates the rotational speed of the electric machine and is arranged between the electrical supply and the electric machine; and
   a sensor device, wherein the actuator is controlled by the regulation device in accordance with an output of the sensor device, wherein the sensor device comprises at least one sensor element for detecting at least one external boundary condition of the rail vehicle,
   wherein the sensor device comprises at least one sound sensor for measuring a sound level in the surroundings of the rail vehicle,
   wherein the compressor is operated, in accordance with the output of the sensor device, with a variable rotational speed which assumes any intermediate value between the maximum rotational speed and the minimum rotational speed, and
   wherein, when the rail vehicle is at a standstill and in the presence of a relatively higher sound level in the surroundings compared to a sound level during a track operation of the rail vehicle, the regulation device operates the compressor with the maximum rotational speed until either the relatively higher sound level falls again or the deactivation pressure is reached.

2. The compressor system of claim 1, further comprising a cooler unit including a cooler fan, wherein the regulation device at least indirectly controls the cooler unit which is arranged downstream of the compressor, wherein a rotational speed of the cooler fan is continuously adjustable by the regulation device.

3. The compressor system of claim 1, wherein the sensor device comprises at least one GPS sensor for measuring a speed of the rail vehicle and at least one acceleration sensor for measuring an acceleration of the rail vehicle, and the least one sound sensor comprises a microphone.

4. The compressor system of claim 1, wherein, in response to presence of a relatively high sound level and a constantly high speed during a track operation compared to a braking operation, the regulation device operates the compressor with a variable rotational speed slightly above the minimum rotational speed, wherein the air pressure in the at least one compressed-air vessel is set to be higher than the activation pressure.

5. The compressor system of claim 1, wherein, in response to presence of a negative acceleration, the regulation device operates the compressor with a maximum rotational speed until a deactivation pressure of the compressor is reached and provides a feed to the at least one compressed-air vessel, wherein, after the deactivation pressure is reached, the compressor is operated with a variable rotational speed below the maximum rotational speed.

6. The compressor system of claim 5, wherein the compressor is deactivated after the negative acceleration has come to an end, and is set to the minimum rotational speed when the activation pressure is reached.

7. The compressor system of claim 1, wherein, when the rail vehicle is at a standstill and in the presence of a relatively lower sound level in the surroundings of the rail vehicle compared to a sound level when the vehicle is in a track operation, the regulation device operates the compressor with intermittent alternation between deactivation when the pressure falls to the activation pressure and operation with the minimum rotational speed when the deactivation pressure is reached.

8. A method for controlling a compressor system for a rail vehicle, the method comprising:
   driving a compressor by an electric machine via a drive shaft and generates compressed air for the at least one compressed-air vessel;

at least indirectly controlling operation of the electric machine using a regulation device to control operation of the electric machine at at least one rotational speed between a maximum rotational speed and a minimum rotational speed;

determining pressure for the regulation device using at least one pressure sensor included in a compressed air-conducting line arranged downstream of the compressor;

continuously manipulating the rotational speed of the electric machine using an actuator and an electric supply, wherein the actuator is arranged between the electrical supply and the electric machine; and controlling the actuator by the regulation device in accordance with an output of a sensor device, wherein the sensor device comprises at least one sensor element for detecting at least one external boundary condition of the rail vehicle, wherein the sensor device comprises at least one sound sensor for measuring a sound level in the surroundings of the rail vehicle, wherein the compressor is operated in accordance with the output of the sensor device, with a variable rotational speed which assumes any intermediate value between the maximum rotational speed and the minimum rotational speed, and when the rail vehicle is at a standstill and in the presence of a relatively higher sound level in the surroundings compared to a sound level during a track operation of the rail vehicle, the regulation device operates the compressor with the maximum rotational speed until either the relatively higher sound level falls again or the deactivation pressure is reached.

9. The method of claim 8, further comprising using the regulation device to at least indirectly control a cooler unit including a cooler fan and being included in the compressor system arranged downstream of the compressor, wherein the regulation device controls a rotational speed of the cooler fan to be continuously adjustable by the regulation device.

10. The method of claim 8, wherein the sensor device comprises at least one GPS sensor for measuring a speed of the rail vehicle and at least one acceleration sensor for measuring an acceleration of the rail vehicle and the at least one sound sensor comprises a microphone for measuring a sound level in the surroundings of the rail vehicle.

11. The method of claim 8, further comprising, in response to presence of a relatively high sound level and a constantly high speed during a track operation compared to a sound level of a braking operation, the regulation device operating the compressor with a variable rotational speed slightly above the minimum rotational speed, wherein the air pressure in the at least one compressed-air vessel is set to be higher than the activation pressure.

12. The method of claim 8, further comprising, in response to presence of a negative acceleration, the regulation device operates the compressor with a maximum rotational speed until a deactivation pressure of the compressor is reached and provides a feed to the at least one compressed-air vessel, wherein, after the deactivation pressure is reached, the compressor is operated with a variable rotational speed below the maximum rotational speed.

13. The method of claim 12, further comprising deactivating the compressor after the negative acceleration has come to an end, and is set to the minimum rotational speed when the activation pressure is reached.

14. The method of claim 11, further comprising, when the rail vehicle is at a standstill and in the presence of a relatively lower sound level in the surroundings of the rail vehicle compared to a sound level when the vehicle is in a track operation, the regulation device operates the compressor with intermittent alternation between deactivation when the pressure falls to the activation pressure and operation with the minimum rotational speed when the deactivation pressure is reached.

* * * * *